No. 715,986. Patented Dec. 16, 1902.
R. B. COLTRIN.
CORE FOR MAKING CEMENT BLOCKS.
(Application filed Oct. 18, 1902.)
(No Model.)
Fig. 1.
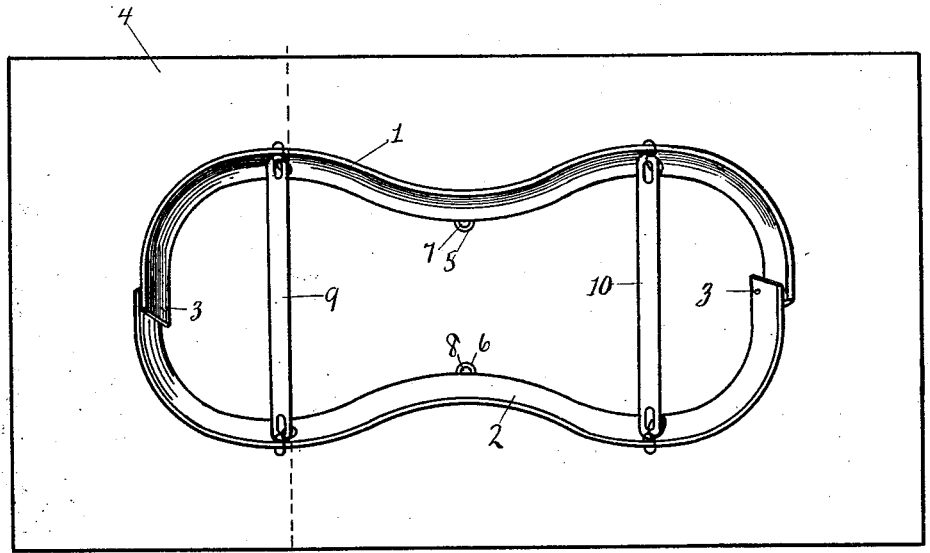
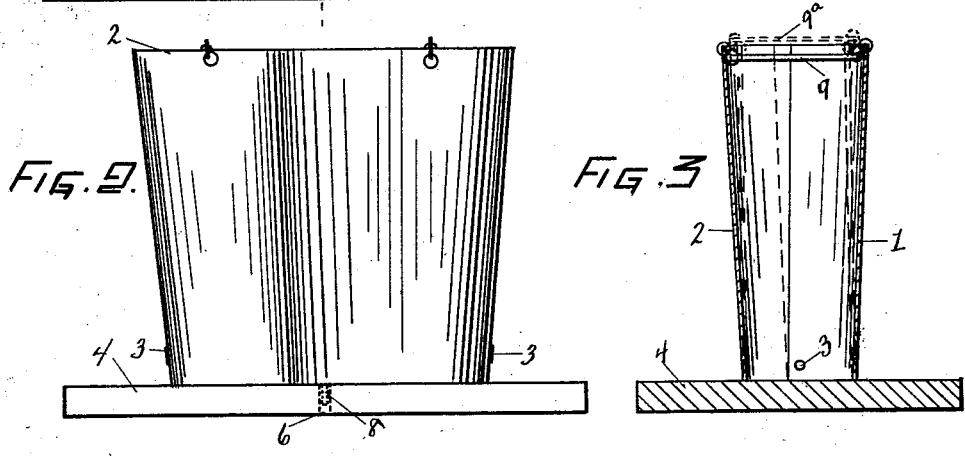
Fig. 4.
WITNESSES:  
INVENTOR:  
Robert B. Coltrin  
By Chester W. Brown  
his Atty
THE NORRIS PETERS CO., PHOTO-LITHO., WASHINGTON, D. C.

UNITED STATES PATENT OFFICE.

ROBERT B. COLTRIN, OF JACKSON, MICHIGAN.

CORE FOR MAKING CEMENT BLOCKS.

SPECIFICATION forming part of Letters Patent No. 715,986, dated December 16, 1902.

Application filed October 18, 1902. Serial No. 127,781. (No model.)

*To all whom it may concern:*

Be it known that I, ROBERT B. COLTRIN, a citizen of the United States, residing at the city of Jackson, in the county of Jackson and State of Michigan, have invented a certain new and useful Improvement in Cores for Making Cement Blocks, of which the following is a specification.

My invention relates to improvements in that class of cores for making cement blocks in which the block of cement is molded around a central core with the purpose of afterward withdrawing the said core and leaving the block hollow. In order to draw said core out of the cement, it is necessary that there be sufficient "draw," as in patterns for molding foundry-castings. It has been customary to make the core project up into the block from below and with the draw or draft to permit the withdrawing of the core from below or the lifting of the block off from the base and the core. To obviate the difficulties arising from such construction, I have made my core of the style shown in the drawings; and the objects of my said improvement are to make a core which is collapsible, and consequently may after the block is molded be collapsed and withdrawn from above without damaging the molded block. It is low in cost and simple and easy of operation, and one core may be used repeatedly without permitting the cement to remain long therein by simply removing the core and then carrying the cement block away upon the base-board to set, employing another base-board for the next block.

In the drawings forming part of this specification, and in which similar figures of reference refer to similar parts throughout the several views, Figure 1 is a top plan view of my said core with the base-board upon which it is adapted to be supported. Fig. 2 is a side elevation of the same. Fig. 3 is a section on the line $a\,b$ of Fig. 1, showing the core in dotted lines after being collapsed for withdrawal from the cement block. Fig. 4 is a view of the means employed for locking the core open and for releasing said core to permit of removal from the cement block.

In the construction of my said mold-core I employ two side pieces 1 and 2 and make them preferably of metal. These side pieces are pivoted together near the bottom by the rivets 3 and 3, producing a hinge-joint. The base-board 4 is adapted for use in my patent mold described in my Patent No. 708,532, dated September 9, 1902, and is adapted to be removed from the mold after the cement block has been molded thereon and the block set away to harden, while a second base-board is substituted in the mold for the next block. This base-board, to accommodate the core and hold it in position, in the present instance is provided with two holes 5 and 6 to receive the rods 7 and 8 on the lower edges of the side members 1 and 2. By this construction the rods 7 and 8 are inserted in the holes 5 and 6, and the core is held securely in place while the cement is being tamped down around the core, and the core not being attached to the base-board in any manner to prevent a removal upward it is apparent that the core may be drawn upward free from said base-board when desired. At the top of the side members, at the widest places therein, I have attached the flat bars 9 and 10. These bars have holes near their ends and are attached to the side members, as shown, by means of links passed through holes in the top of the side members. By this construction the bars are held in place, attached to the said side members, and when it is desired to mold a cement block the core is placed upon the base-board, with the rods 7 and 8 in engagement with the holes 5 and 6 in said base-board. The side members are spread apart at the top until the bars 9 and 10 can be inserted between them, as shown in Fig. 4. The side members are then forced together against the ends of said bars, and the bars act as braces to prevent the side members 1 and 2 from coming nearer together than the length of said bars 9 and 10. In this manner the core is braced to withstand the pressure of the cement without while the cement block is being molded. When the block has been molded and it is desired to remove it from the mold, the bars 9 and 10 are drawn upward until they are above the tops of the side members 1 and 2, and the side members are pressed together, presenting the appearance shown by dotted lines in Fig. 3, when the core is out of contact with the cement block, excepting slightly at the bottom, and may be raised or drawn directly upward without in any way marring or interfering with said cement block. The block may now be carried away upon said base-board, another base-board substituted in the machine, and the core replaced thereon for molding a second and any subsequently desired number of blocks.

While I have shown my said core as shaped with elliptical ends joined together by a narrow neck, it will be apparent that my said core may be of any other suitable pattern in which the side members are capable of being joined together near the bottom, as shown herein, and the top portions above are capable of being forced together, as shown herein. It will also be apparent that the said core may be used separate from the said base-board and from said mold, hereinbefore referred to, and that the core may be used at any place where it is desired to mold cement with an opening in the middle, as the core may be placed at the point where it is desired to have such opening and then be withdrawn after the block or cement has set. It will further be apparent that instead of the bars with the links joining them to the side members other means may be employed, consisting of a rigid middle portion with flexible extremities at the ends, which permit of the pushing of said middle rigid portions between the said side members to act as braces while the cement is being molded about the exterior and which also permit said middle rigid portions to be raised sufficiently to clear the tops of the side members to allow them to telescope together at the top for withdrawal.

The style of hollow cement block formed by my said core has a special advantage over those where the core is drawn from the under side in that the side walls of the block when formed with my core are narrower at the top than at the bottom, and consequently there is a wider base to support the side while it is being dried, whereas with those drawing the core from below the side walls of the block are narrower at the bottom than at the top and the upper portion of the wall overhangs the base and having less support is more liable to settle or break off or become out of shape in drying, especially if it should be very green at the time of removal of the core.

Having thus described my invention, what I claim, and desire to secure by Letters Patent, is the following:

1. In a core for cement-molds, two side members, joined by a hinge-joint at one edge, and connected together at the other edge by connections having a rigid middle, with flexible extremities joined to the side members.

2. In a core for cement-molds, a base-board having perforations therein; side members connected by a hinge-joint and having projections on the joined side engaging said perforations, and rigid joining members at the other edge attached to the side members by means of flexible connections.

3. In a device of the class described, the combination with a base-board having openings therein, a core composed of two side members having downward projections engaging said openings; rivets connecting said side members near the bottom; and connections at the top, consisting of a rigid middle portion, and links connecting said middle portion to the side members on either side.

4. In a device of the class described, the combination with side members having downward projections at their lower extremities, of rivets connecting said members together, and braces connected to said side members by means of rings at the top, substantially as shown and described.

ROBERT B. COLTRIN.

Witnesses:
   BESS V. REDFIELD,
   CHESTER W. BROWN.